(No Model.)
J. VAN DE WATER.
BUNDLE CARRIER FOR GRAIN BINDING MACHINES.
No. 326,694. Patented Sept. 22, 1885.
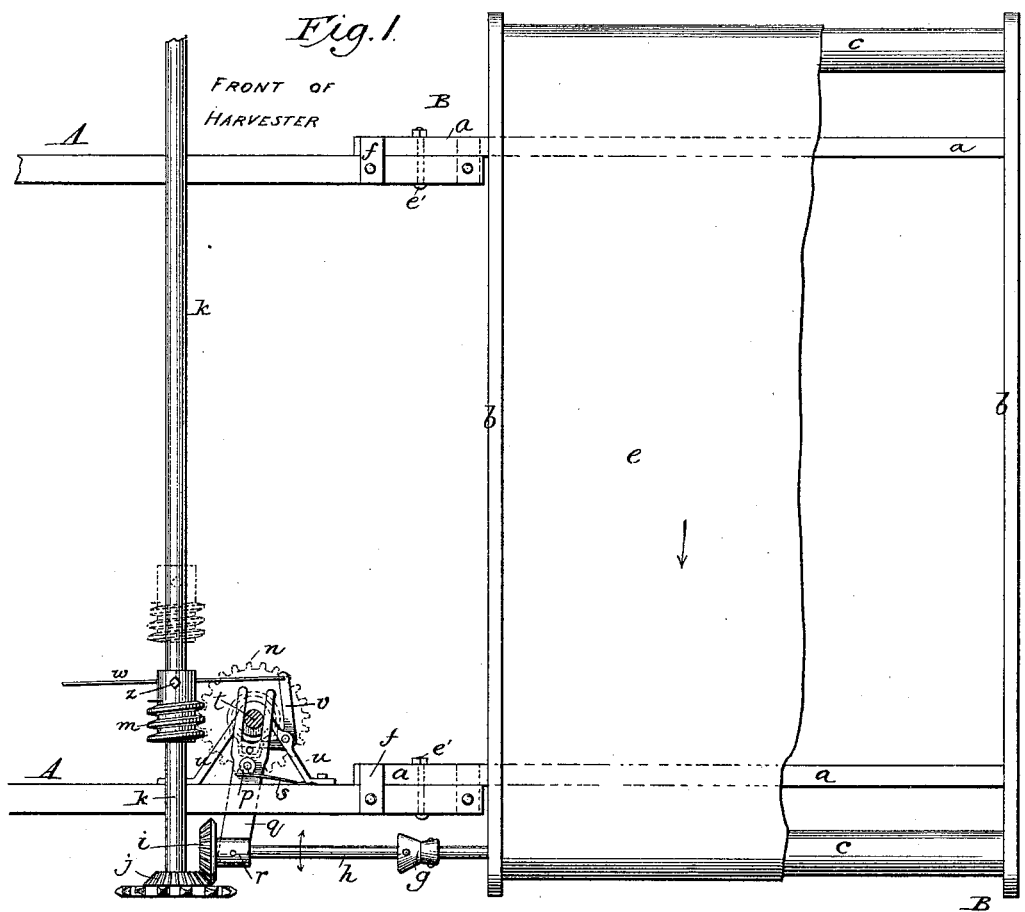

UNITED STATES PATENT OFFICE.

JOSEPH VAN DE WATER, OF WHITEWATER, WISCONSIN, ASSIGNOR TO GEORGE ESTERLY & SON, OF SAME PLACE.

BUNDLE-CARRIER FOR GRAIN-BINDING MACHINES.

SPECIFICATION forming part of Letters Patent No. 326,694, dated September 22, 1885.

Application filed June 17, 1884. (No model.)

*To all whom it may concern:*

Be it known that I, JOSEPH VAN DE WATER, of Whitewater, in the county of Walworth and State of Wisconsin, have invented certain Improvements in Bundle-Carriers for Grain-Binding Machines, of which the following is a specification.

The object of this invention is to provide an automatic grain harvesting and binding machine with means for carrying the bound bundles and delivering them from the machine at intervals, a number at a time.

It is the special aim of the invention to adapt the mechanism to deliver the bound bundles at regular periods, or to deliver them at the will of the operator, as may be demanded.

Referring to the accompanying drawings, Figure 1 represents a top plan view of my mechanism applied to the frame of a harvesting and binding machine. Fig. 2 is an under face view of the cam by which the driving-gear is automatically thrown into and out of action. Fig. 3 is a perspective view of the principal operative parts of the mechanism.

A represents one side of the harvester-frame, which may be constructed in any ordinary or suitable manner, and provided with a binding mechanism of any known form, the application of my improvement being in no wise dependent upon the particular construction of the harvester or binder. I recommend, however, as a suitable machine upon which to employ the devices, that represented in Letters Patent of the United States, granted to me on the 1st day of August, 1882, No. 262,182.

B represents a carrier-frame, consisting, in the present instance, of the two arms $a$, bolted at one end to the harvester-frame and extending horizontally therefrom on the inner or stubble side, and of two longitudinal bars, $b$, secured to the arms $a$ in any suitable manner, for the purpose of giving support to two horizontal rolls, $c$, one at the forward and the other at the rear end. These rolls serve to support and give motion to an endless belt or apron, $e$, which is thus sustained below the binding-table in position to receive the bound bundles of grain as they are delivered therefrom.

It is to be noted, as a peculiarity of my construction, that the carrier-apron $e$ travels in a line parallel to that in which the machine advances, so that the bound bundles delivered sidewise from the machine upon the apron $e$ are delivered thereby in an endwise direction upon the ground in rear of the machine, the heads first leaving the apron and encountering the stubble, so that the bundles fall easily and with a slight tendency to thrash or scatter the grain. This is an important feature in the harvesting of overripe grain, the unnecessary handling of which is accompanied by waste.

The bolts $e'$, by which the carrier-frame is connected to the main frame, will serve as pivots to admit of the carrier-frame being turned to an upright position when not in use, in order to reduce the width of the machine and to admit of its being driven through gates or narrow openings.

To sustain the frame in a horizontal position, I employ, in addition to the bolts, plates $f$, bolted to the harvester-frame and arranged to bear against the upper and under surfaces of the arms $a$, in the manner represented. One journal of the rear roll, $c$, I connect by a universal joint or coupling, $g$, to a driving-shaft, $h$, the end of which bears on a pinion, $i$, engaged with and driven by a pinion, $j$, on a horizontal shaft, $k$. The last-mentioned shaft extends in a fore and-aft direction, and is usually the shaft by which motion is communicated to the harvester, being identical with the shaft designated K in my patent before alluded to. Connection may, however, be had with any other shaft ordinarily employed in the binder or harvester, or with a shaft introduced into the machine for the special purpose, provided it is driven from the harvesting mechanism. The joint $g$ admits of the shaft $h$ being moved laterally to throw the gear $i$ into and out of engagement with the driving-gear $j$, this connection and disconnection of the gear serving, on the one hand, to permit the endless apron to remain at rest during the accumulation of the bundles thereon, and serving, on the other hand, to impart motion to the apron in order to deliver the bound bundles in a rearward direction.

For the purpose of automatically throwing the gear into and out of action at suitable intervals, I provide the driving-shaft $k$ with a worm, $m$, which engages with corresponding teeth on the periphery of a wheel, $n$, the under surface of which is provided with a cam, the periphery of which is concentric with the axis for the greater portion of its length. Against the cam I seat a roller, $p$, attached to a reciprocating arm, $q$, one end of which is slotted to encircle a stud around which the cam-wheel revolves, while the opposite end is pivoted to a journal box or bearing, $r$, which sustains the forward movable end of the shaft $h$. A spring, $s$, acts against the roller $p$, and tends to urge the arm $q$ endwise toward the axis of the wheel, thereby moving the gear $i$ out of engagement and permitting the apron to remain at rest.

During the progress of the machine the worm imparts a slow but continuous rotation to the gear and cam, causing the latter at the proper time to act against the stud $p$, and force the arm $q$ endwise, the effect being to throw the gear $i$ into engagement and retain it in engagement during the time required for the apron to move a sufficient distance to discharge the accumulated bundles. As soon as the delivery of the bundles has been effected the cam passes the roller $p$, and the parts are again thrown out of engagement by the action of the spring. The cam-wheel revolves on a vertical stud or axis, $t$, which is supported on a bracket, $u$, bolted to the frame, as represented in Figs. 1 and 3; but it may receive support in any other appropriate manner.

In addition to the automatic devices above described for throwing the driving-gear into action, I provide an elbow-lever, $v$, which is bolted to the bracket $u$, and arranged to bear at one end against a stud or projection on the shifting-arm $q$, while at the opposite end it is connected by a rod or chain, $w$, to a hand-lever, foot-lever, or other device located on the harvester in such position as to be conveniently operated by the attendant riding thereon.

The operation of the lever or treadle causes the rod $w$ to actuate the lever $v$, which in turn forces the shifting-arm $q$ endwise, throwing the gear $i$ into engagement. By means of this device the attendant is enabled to effect the delivery of the bundle at any time desired without waiting for the action of the automatic devices.

In order that the automatic devices may be thrown entirely out of action, I secure the worm $m$ to the driving-shaft by means of a set-screw, $z$, or equivalent fastening devices which will admit of its being moved endwise out of engagement with the wheel $n$, as represented in dotted lines. When the parts are thus adjusted, reliance is placed wholly on the devices operated by the attendant, who is enabled to effect the stopping and starting of the apron at will, and to cause this operation continuously, or for any length of time required.

Having thus described my invention, what I claim is—

1. In combination with a grain harvesting and binding machine, an endless apron or carrier to receive the bound bundles, the driving-train having a movable pinion through which motion is communicated to the apron, the worm-gear connected with the harvester, and the cam actuated by said gear to throw the pinion into engagement.

2. The shaft $k$ of a harvester and binder, the worm $m$, the cam-wheel $n$, driven therefrom, the endless carrier, its driving-shaft $p$, the driving-gears $i$ and $j$, the arm $q$, and the spring $s$.

3. In combination with a grain harvesting and binding machine, an endless apron to receive the bound bundles and discharge them upon the ground, and supports for said aprons hinged to the harvester-frame, whereby the apron is permitted to fold upward, that the machine may be passed through gates and other restricted openings.

JOSEPH VAN DE WATER.

Witnesses:
J. H. PAGE,
EDWIN T. CASS.